(No Model.)
C. T. PELTON.
SELF SET ANIMAL TRAP.
No. 585,045.                     Patented June 22, 1897.
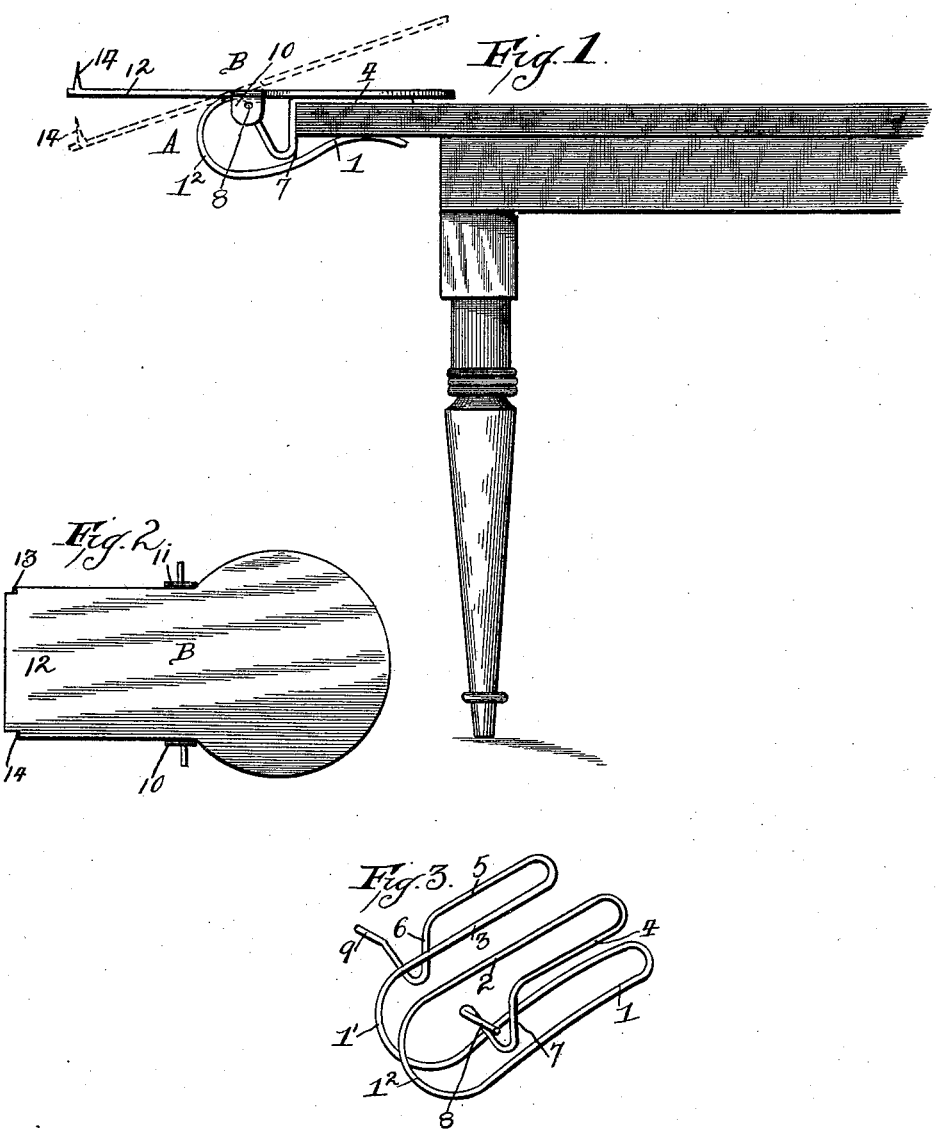
Witnesses
Jos. Gregory
R. A. Hau
Inventor,
Chilion T. Pelton.
by John Wedderburn
Attorney

UNITED STATES PATENT OFFICE.

CHILION T. PELTON, OF PERRIS, CALIFORNIA.

SELF-SET ANIMAL-TRAP.

SPECIFICATION forming part of Letters Patent No. 585,045, dated June 22, 1897.

Application filed June 22, 1896. Serial No. 596,486. (No model.)

*To all whom it may concern:*

Be it known that I, CHILION T. PELTON, a citizen of the United States, residing at Perris, in the county of Riverside and State of California, have invented certain new and useful Improvements in Self-Set and Ever-Set Traps; and I do hereby declare the following to be a full, clear, and exact description of the invention, such as will enable others skilled in the art to which it appertains to make and use the same.

My invention relates to self-set and ever-set traps.

My object is to provide a simple and cheap animal-trap of the tilting-platform type, which will be quick and efficient in its operation and one which may be quickly and easily baited and set.

Having this object in view, my improved animal-trap consists of a clamp adapted for connection to the edge of a table or shelf and a tilting platform hinged to the clamp and provided at its outer end with a bait-holder, said platform being adapted to tilt when the animal reaches its outer end, thereby precipitating the animal into any suitable receptacle containing water, which may be located beneath the trap.

In the accompanying drawings, Figure 1 is a side elevation of my improved trap in use, dotted lines representing the platform when tilted; Fig. 2 a plan view, and Fig. 3 a detail view, of the clamp.

A designates the clamp, and B the tilting platform.

The clamp is constructed of a single piece of stout wire, which is bent into a lower tongue 1, with curved abutments 1' and 1², upper portions 2 and 3 extending in substantially parallel relation to the tongue, said upper portions being rebent into fingers 4 and 5, which lie in the same plane with portions 2 and 3, said clamp also being provided with downwardly-projecting limit-fingers 6 and 7, which terminate in outwardly-extending journals 8 and 9. When the clamp is in position, as shown in Fig. 1, tongue 1 is underneath the table, portions 2 and 3 and fingers 4 and 5 rest on top of the table, while the limit-fingers abut against the edge of the table, so that the journals are offset from the table, as shown. The wire of which the clamp is constructed should be somewhat springy, so that the table will be firmly kept between the parts which straddle it. It will be observed that the limit-fingers prevent the clamp from sliding back too far on the table or shelf to which it is attached.

The tilting platform is provided with ears 10 and 11 about intermediate its ends, and these ears loosely receive the journals of the clamp, so that the platform may swing easily. The platform consists of an outer trip portion 12, which is provided at its extreme outer end with bait-hooks 13 and 14, and an inner enlarged portion 15, which normally rests on the top of the clamp.

The trap operates in the following manner: When the animal, having been enticed by the bait, is on the trip portion of the platform and has almost reached the bait, his weight causes the platform to tilt, thereby precipitating him into a suitable receptacle filled with water, which is located on the floor below the trap, as shown in dotted lines in Fig. 1. Inasmuch as the rear portion of the platform is heavier than the trip portion, after the animal has left the platform the latter tilts back to normal horizontal position ready for another animal. The curved abutments 1' and 1² prevent the platform from tilting so far that it cannot return to normal position.

Having thus described my invention, what I claim as new, and desire to secure by Letters Patent, is—

1. In a self-set and ever-set animal-trap, the combination with a clamp comprising spring-fingers which are adapted to straddle the edge of a table or shelf, and limit fingers or abutments which are connected to the spring-fingers and adapted to rest against the edge of the shelf or table, of a tilting platform hinged to the clamp and adapted to automatically return to set position after being tilted.

2. In a self-set and ever-set animal-trap, the combination with a clamp consisting of a piece of spring-wire bent into upper and lower fingers which are adapted to straddle the edge of a shelf or table, limit fingers or abutments which rest against the edge of the table or shelf and prevent the clamp from slipping too far inward, and journals, of a tilting platform having ears which receive said journals, said platform being adapted to return to horizontally-set position.

In testimony whereof I have signed this specification in the presence of two subscribing witnesses.

CHILION T. PELTON.

Witnesses:
 MYRON WOLCOTT,
 W. S. WISE.